United States Patent
He et al.

(10) Patent No.: US 10,121,046 B2
(45) Date of Patent: Nov. 6, 2018

(54) DERMATOGLYPH IDENTIFICATION APPARATUS AND IDENTIFYING METHOD THEREOF

(71) Applicant: HIMAX TECHNOLOGIES LIMITED, Tainan (TW)

(72) Inventors: Jia-Ming He, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 167 days.

(21) Appl. No.: 15/253,410

(22) Filed: Aug. 31, 2016

(65) Prior Publication Data

US 2018/0060634 A1 Mar. 1, 2018

(51) Int. Cl.
*G06K 9/28* (2006.01)
*G06K 9/00* (2006.01)

(52) U.S. Cl.
CPC ....... *G06K 9/0002* (2013.01); *G06K 9/00087* (2013.01)

(58) Field of Classification Search
CPC .................................................. G06K 9/0002
See application file for complete search history.

(56) References Cited

U.S. PATENT DOCUMENTS

| 2002/0152048 | A1* | 10/2002 | Hayes | G01D 5/2405 |
| | | | | 702/127 |
| 2013/0177220 | A1* | 7/2013 | Erhart | G06K 9/0002 |
| | | | | 382/124 |
| 2017/0038866 | A1* | 2/2017 | Akhavan Fomani | G06F 3/044 |

FOREIGN PATENT DOCUMENTS

| CN | 104766053 | 7/2015 |
| TW | 201537467 | 10/2015 |

OTHER PUBLICATIONS

"Office Action of Taiwan Counterpart Application," dated Jul. 26, 2017, p. 1-p. 5.

* cited by examiner

Primary Examiner — Brian Werner
(74) Attorney, Agent, or Firm — J.C. Patents

(57) ABSTRACT

A dermatoglyph identification apparatus and an identifying method thereof are provided. The dermatoglyph identification apparatus includes a switch circuit, a signal source and a plurality of sensors. The signal source is selectively connected to the sensors through an impedance element. The switch circuit switches at least one sensor to be connected to the impedance element, and switches rest of the sensors to be connected to a ground terminal of the signal source. The dermatoglyph identification apparatus identifies dermatoglyph according to a sensing signal generated by the sensor connected to the impedance element in response to a reference signal of the signal source.

10 Claims, 2 Drawing Sheets

DERMATOGLYPH IDENTIFICATION APPARATUS AND IDENTIFYING METHOD THEREOF

BACKGROUND OF THE INVENTION

1. Field of the Invention

The invention relates to an identification apparatus, and particularly relates to a dermatoglyph identification apparatus and an identifying method of the dermatoglyph identification apparatus.

2. Description of Related Art

More and more electronic products nowadays, such as mobile phones and tablet computers, provide the fingerprint identification function. Also, the applications of fingerprint identification have become much broader. For example, fingerprint identification may be used to verify the user's identity. Since the capacitance values generated when detecting the concave and convex changes of the fingerprint are very small, if a parasitic capacitance is generated or the human body and the fingerprint detecting chip are not commonly connected to the ground, the capacitance values of the fingerprint to be defected may be significantly attenuated, making fingerprint identification more challenging. A conventional way to solve this issue is to dispose a copper ring having a ground voltage level the same as that of the internal fingerprint detecting chip in the mobile phone. When the user performs fingerprint identification, the sensor and the copper ring are touched at the same time. Thus, one end of the sensing capacitance and the internal fingerprint detecting chip may have the same ground voltage level, so as to prevent the issue that one end of the sensing capacitance is floating and thus increase the accuracy of fingerprint identification.

SUMMARY OF THE INVENTION

The invention provides a dermatoglyph identification apparatus and an identifying method of the dermatoglyph identification apparatus A dermatoglyph identification apparatus according to an embodiment of the invention includes a plurality of sensors, a switch circuit, and a signal source. The sensors are used to detect a dermatoglyph. The switch circuit is coupled to the sensors and a ground terminal of the signal source. The signal source is coupled to the switch circuit through an impedance element, and the signal source generates a reference signal. The switch circuit switches at least one of the sensors to be connected to the impedance element and switches rest of the sensors to be connected to the ground terminal, the at least one sensor generates a sensing signal in response to the reference signal, and the dermatoglyph identification apparatus identifies the dermatoglyph based on the sensing signal.

According to an embodiment of the invention, the switch circuit switches the sensors to be connected to the impedance element in turn, and switches the rest of the sensors not connected to the impedance element to be connected to the ground terminal.

According to an embodiment of the invention, when a sensing object touches the sensors, a sensing capacitance corresponding to the at least one sensor is in serial connection with sensing capacitances corresponding to the rest of the sensors between the impedance element and the ground terminal through the sensing object.

According to an embodiment of the invention, the sensing object is a finger.

According to an embodiment of the invention, the dermatoglyph identification apparatus further includes a processing circuit. The processing circuit is coupled to the impedance element and the switching circuit and converts the sensing signal into sensing information.

According to an embodiment of the invention, the processing circuit includes an amplifier and an analog-to-digital converting circuit. The amplifier is coupled to the impedance element and amplifies the sensing signal. The analog-to-digital converting circuit is coupled to the amplifier and converts the amplified sensing signal into the sensing information.

According to an embodiment of the invention, each of the sensors includes a sensing electrode.

An embodiment of the invention also provides a dermatoglyph identifying method of a dermatoglyph identification apparatus. The dermatoglyph identification apparatus includes a signal source and a plurality of sensors, and the signal source is selectively connected to the sensors through an impedance element. The dermatoglyph identifying method of the dermatoglyph identification apparatus includes steps as follows: switching at least one sensor to be connected to the impedance element; switching rest of the sensors to be connected to a ground terminal of the signal source; and identifying the dermatoglyph based on a sensing signal generated by the at least one sensor in response to the reference signal.

According to an embodiment of the invention, the dermatoglyph identifying method of the dermatoglyph identification apparatus includes switching the sensors to be connected to the impedance element in turn.

According to an embodiment of the invention, when a sensing object touches the sensors, a sensing capacitance corresponding to the at least one sensor is in serial connection with sensing capacitances corresponding to the rest of the sensors between the impedance element and the ground terminal through the sensing object.

Based on the above, in the dermatoglyph identification apparatus according to the embodiments of the invention, at least one of the sensors is switched to be connected to the impedance element, and the rest of the sensors are switched to be connected to the ground terminal of the signal source. Thus, the sensor connected to the impedance element may generate the sensing signal on the impedance element in response to the reference signal provided by the signal source. In this way, the sensing capacitance and the signal source are still commonly connected to the ground without the copper ring, and fingerprint identification may consequently be performed accurately.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
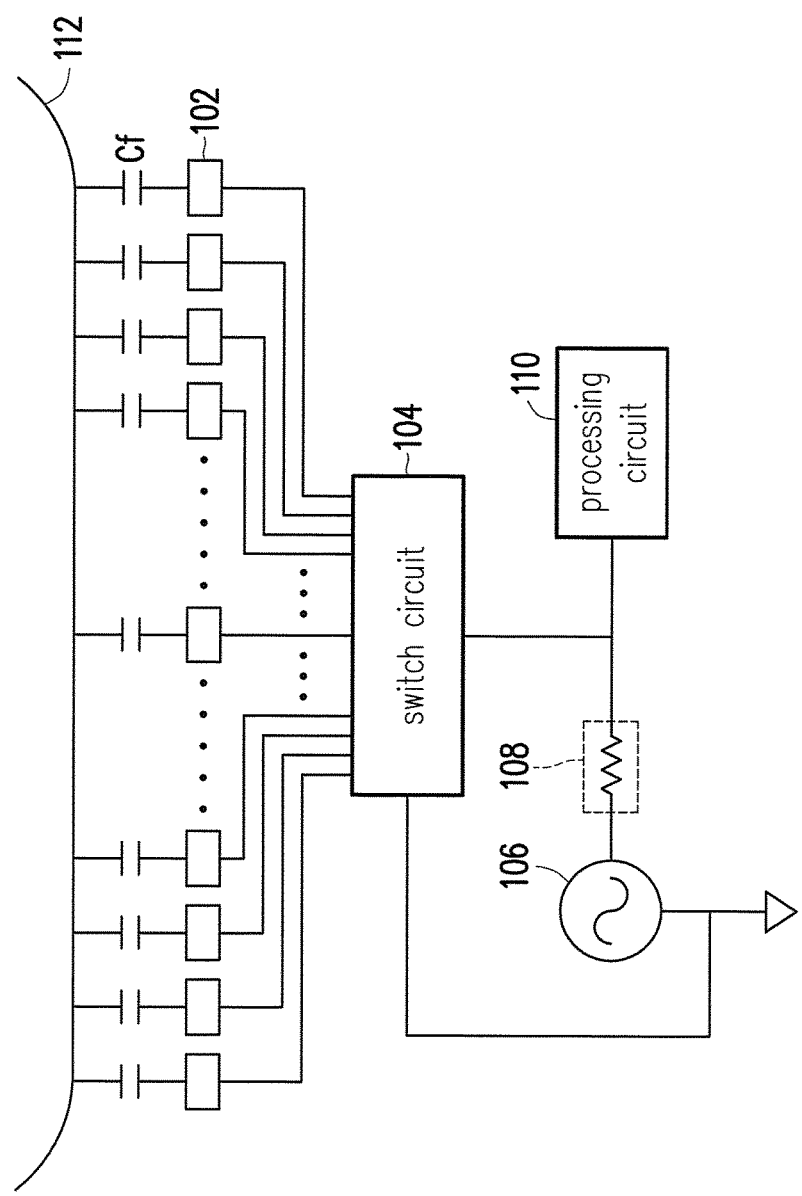
FIG. 1 is a schematic view illustrating a dermatoglyph identification apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view illustrating a dermatoglyph identification apparatus according to an embodiment of the invention. Referring to FIG. 1, the dermatoglyph identification apparatus includes a plurality of sensors 102, a switch circuit 104, a signal source 106, and a processing circuit 110. The switch circuit 104 is coupled to the respective sensors 102 and the processing circuit 110. The signal source 106 is coupled to the switch circuit 104 and the processing circuit 110 through an impedance element 108. In addition, the impedance element 108 may be a resistance element or an equivalent resistance of a circuit wire, for example. However, the invention is not limited thereto.

The sensor 102 is configured to detect a sensing object 112, such as a fingerprint of a finger. However, the invention is not limited thereto. The sensor 102 may also detect a dermatoglyph of other parts. The sensors 102 may include sensing electrodes. The sensing electrodes of the sensors 102 may form a sensing array, so as to define a sensing region for sensing and identifying the dermatoglyph. The signal source 106 may generate a reference signal, so that the sensor 102 may generate a sensing signal in response to the reference signal. When the sensing object 112 touches the sensors 102 for dermatoglyph identification, the switch circuit 104 may switch at least one of the sensors 102 to be connected to the impedance element 108, and switch rest of the sensors 102 to be connected to a ground terminal of the signal source 106. In addition, the ground terminal is connected to a ground voltage. Under this circumstance, the reference signal provided by the signal source 106 may be transmitted to the sensor 102 connected to the impedance element 108 through the impedance element 108. Accordingly, the sensor 102 connected to the impedance element 108 may generate the sensing signal in response to the reference signal to allow the dermatoglyph identification apparatus to perform dermatoglyph identification based on the sensing signal. For example, the processing circuit 110 may convert the sensing signal into sensing information for dermatoglyph identification.

Figure 2:
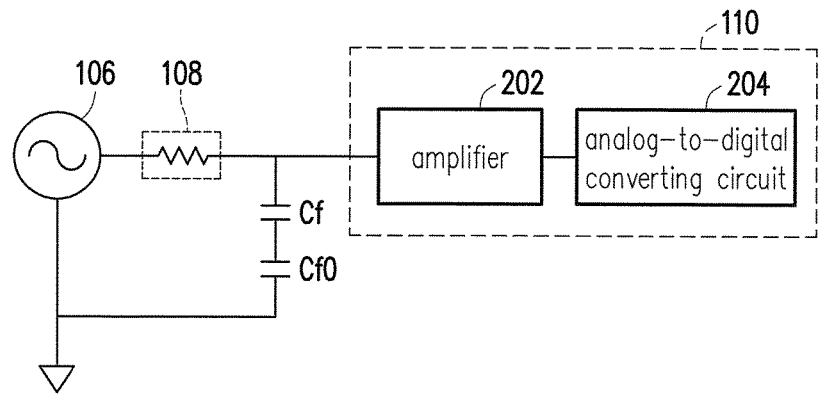
FIG. 2 is a schematic equivalent circuit diagram illustrating a dermatoglyph identification apparatus according to an embodiment of the invention.

FIG. 2 is a schematic equivalent circuit diagram illustrating a dermatoglyph identification apparatus according to an embodiment of the invention. Referring to FIG. 2, when the sensing object 112 (e.g., a finger) touches the sensors 102 for dermatoglyph identification, a sensing capacitance Cf is generated between each sensor 102 and the sensing object 112. In this embodiment, only one of the sensors 102 is switched by the switch circuit 104 to be connected to the impedance element 108, whereas the rest of the sensors 102 are switched to be connected to a ground terminal of the signal source 106. In addition, the sensing capacitances Cf corresponding the sensors 102 switched to be connected to the ground terminal of the signal source 106 are in parallel connection and equivalent to a sensing capacitance Cf0 shown in FIG. 2. In other words, a capacitance value of the sensing capacitance Cf0 is equivalent to a total of the sensing capacitances Cf corresponding to the sensors 102 switched to be connected to the ground terminal of the signal source 106.

As shown in FIG. 2, the sensing capacitance Cf corresponding to the sensor 102 switched to be connected to the impedance element 108 is in serial connection with the sensing capacitance Cf0 corresponding to the sensors 102 switched to be connected to the ground terminal of the signal source 106 between the impedance element 108 and the ground through the sensing object 112. Since the capacitance value of the sensing capacitance CM is far greater than a capacitance value of the sensing capacitance Cf, a capacitance value of the sensing capacitance Cf0 and the sensing capacitance Cf in serial connection is almost equal to the capacitance value of the sensing capacitance Cf. In this way, the sensing signal output at a common connection point of the impedance element 108 and the sensing capacitance Cf is only responsive to the capacitance value sensed by the sensor 102 switched to be connected to the impedance element 108. In addition, since the sensing capacitance Cf0 and the sensing capacitance Cf of FIG. 2 are in serial connection between the impedance element 108 and the ground, the issue that one end of a capacitance is floating does not arise, and the capacitance value sensed by the sensor 102 switched to be connected to the impedance element 108 may be accurately reflected. In addition, the processing circuit 110 in this embodiment may include an amplifier 202 and an analog-to-digital converting circuit 204, for example. In addition, the amplifier 202 is coupled to the impedance element 108 and the analog-to-digital converting circuit 204. The amplifier 202 may amplify the sensing signal, and the analog-to-digital converting circuit 204 converts the amplified sensing signal into the sensing information for dermatoglyph identification.

The switch circuit 104 may switch the respective sensors 102 to be connected to the impedance element 108 in turn, and switch the rest of the sensors 102, which are not switched to be connected to the impedance element 108, to be connected to the ground terminal, so as to obtain the sensing signals generated by the respective sensors 102 in turn, thereby obtaining capacitance changes at respective positions in the sensing array to accurately obtain a dermatoglyph feature of the sensing object.

Figure 3:
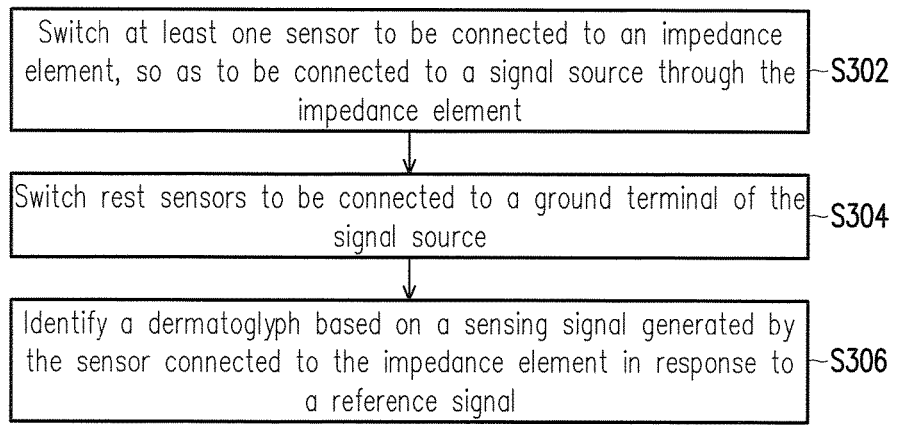
FIG. 3 is a flowchart illustrating an identifying method of a dermatoglyph identification apparatus according to an embodiment of the invention.

FIG. 3 is a flowchart illustrating an identifying method of a dermatoglyph identification apparatus according to an embodiment of the invention. Referring to FIG. 3, the identifying method of the dermatoglyph identification apparatus may include steps as follows. First of all, at least one sensor is switched to be connected to the impedance element, so as to be connected to the signal source through the impedance element (Step S302). Then, the rest of the sensors are switched to be connected to the ground terminal of the signal source (Step S304). Then, dermatoglyph identification is performed based on the sensing signal generated by the sensor connected to the impedance element in response to the reference signal (Step S306). When the sensing object touches the sensors, the sensing capacitance corresponding to the sensor connected to the impedance element is in serial connection with the sensing capacitances corresponding to the rest of the sensors between the impedance element and the ground terminal through the sensing object. In this way, the sensing signal is only responsive to the capacitance value sensed by the sensor switched to be connected to the impedance element, and the issue that one end of the capacitance is floating does not arise. Therefore, the capacitance value sensed by the sensor switched to be connected to the impedance element may be accurately reflected. By connecting the sensors to the impedance element in turn while connecting the rest of the sensors, which are not switched to be connected to the impedance element, to the ground terminal, the sensing signals generated by the respective sensors may be obtained in turn, and the dermatoglyph feature of the sensing object may thus be obtained accurately.

In view of the foregoing, in the dermatoglyph identification apparatus according to the embodiments of the invention, at least one of the sensors is switched to be connected to the impedance element, and the rest of the sensors are switched to be connected to the ground terminal of the signal source. Thus, the sensor connected to the impedance element may generate the sensing signal on the impedance element in response to the reference signal provided by the signal source. Thus, even if a copper ring is not disposed, the sensing capacitance and the signal source are still commonly connected to the ground without leaving one end of the capacitance floating. Thus, fingerprint identification may be correctly performed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dermatoglyph identification apparatus, comprising:
a plurality of sensors, detecting a dermatoglyph;
a switch circuit, coupled to the sensors; and
a signal source, having a ground terminal and an output terminal, wherein the output terminal is coupled to the switch circuit through an impedance circuit and the ground terminal is coupled to the switch circuit, the signal source generates a reference signal, the switch circuit switches at least one of the sensors to be connected to the output terminal of the signal source through the impedance circuit and switches rest of the sensors to be connected to the ground terminal, the at least one sensor generates a sensing signal in response to the reference signal and the impedance circuit, and the dermatoglyph identification apparatus identifies the dermatoglyph based on the sensing signal.

2. The dermatoglyph identification apparatus as claimed in claim 1, wherein the switch circuit switches the sensors to be connected to the impedance circuit in turn, and switches the rest of the sensors not connected to the impedance circuit to be connected to the ground terminal.

3. The dermatoglyph identification apparatus as claimed in claim 1, wherein when a sensing object touches the sensors, a sensing capacitance corresponding to the at least one sensor is in serial connection with sensing capacitances corresponding to the rest of the sensors between the impedance circuit and the ground terminal through the sensing object.

4. The dermatoglyph identification apparatus as claimed in claim 3, wherein the sensing object is a finger.

5. The dermatoglyph identification apparatus as claimed in claim 1, further comprising:
a processing circuit, coupled to the impedance circuit and the switching circuit and converting the sensing signal into sensing information.

6. The dermatoglyph identification apparatus as claimed in claim 5, wherein the processing circuit comprises:
an amplifier, coupled to the impedance circuit and amplifying the sensing signal; and
an analog-to-digital converting circuit, coupled to the amplifier and converting the amplified sensing signal into the sensing information.

7. The dermatoglyph identification apparatus as claimed in claim 1, wherein each of the sensors comprises a sensing electrode.

8. A dermatoglyph identifying method of a dermatoglyph identification apparatus, wherein the dermatoglyph identification apparatus comprises a signal source, a plurality of sensors, and an impedance circuit, the signal source is selectively connected to the sensors through the impedance circuit, and the dermatoglyph identifying method of the dermatoglyph identification apparatus comprises:
switching at least one sensor to be connected to an output terminal of the signal source through the impedance circuit;
switching rest of the sensors to be connected to a ground terminal of the signal source; and
identifying the dermatoglyph based on a sensing signal generated by the at least one sensor in response to the reference signal and the impedance circuit.

9. The dermatoglyph identifying method of the dermatoglyph identification apparatus as claimed in claim 8, comprising:
switching the sensors to be connected to the impedance circuit in turn.

10. The dermatoglyph identifying method of the dermatoglyph identification apparatus as claimed in claim 8, wherein when a sensing object touches the sensors, a sensing capacitance corresponding to the at least one sensor is in serial connection with sensing capacitances corresponding to the rest of the sensors between the impedance circuit and the ground terminal through the sensing object.

* * * * *